United States Patent [19]
Sciammarella et al.

[11] Patent Number: 6,097,387
[45] Date of Patent: Aug. 1, 2000

[54] DYNAMIC CONTROL OF PANNING OPERATION IN COMPUTER GRAPHICS

[75] Inventors: Eduardo Sciammarella; Tom Grauman, both of New York; Nghi Doan, Bronx, all of N.Y.

[73] Assignees: Sony Corporation, Tokyo, Japan; Sony Electronics Inc., Park Ridge, N.J.

[21] Appl. No.: 09/075,663

[22] Filed: May 11, 1998

[51] Int. Cl.$^7$ .................................................. G06F 3/14
[52] U.S. Cl. ............................................ 345/341; 345/123
[58] Field of Search .................................... 345/339, 340, 345/341, 352, 973, 121, 123, 125, 145, 146, 156, 157

[56] References Cited

U.S. PATENT DOCUMENTS

| | | | |
|---|---|---|---|
| 5,075,673 | 12/1991 | Yanker | 345/163 |
| 5,196,838 | 3/1993 | Meier et al. | 345/118 |
| 5,263,134 | 11/1993 | Paal et al. | 345/342 |
| 5,333,247 | 7/1994 | Gest et al. | 345/438 |
| 5,384,909 | 1/1995 | Brown | 345/341 |
| 5,495,566 | 2/1996 | Kwatinetz | 345/341 |
| 5,528,260 | 6/1996 | Kent | 345/123 |
| 5,588,100 | 12/1996 | Parker | 345/442 |
| 5,611,060 | 3/1997 | Belfiore et al. | 345/341 |
| 5,864,330 | 1/1999 | Haynes | 345/123 |
| 5,867,158 | 2/1999 | Murasaki et al. | 345/341 |

*Primary Examiner*—Crescelle N. dela Torre
*Attorney, Agent, or Firm*—Frommer Lawrence & Haug, LLP.; William S. Frommer

[57] ABSTRACT

A graphical universe that is larger than a display screen is displayed on a screen using a panning operation. To view portions of the graphical universe, a cursor positioned on the display screen using an input device is utilized to fix a reference location for the panning operation. By moving the cursor on the display screen, a line between the cursor and the reference location is provided. The direction of the line indicates direction of the panning operation, while the length of the line determines speed of the panning operation.

6 Claims, 6 Drawing Sheets

DYNAMIC CONTROL OF PANNING OPERATION IN COMPUTER GRAPHICS

BACKGROUND OF THE INVENTION

The invention is related to computer graphics and, in particular, a user interface using computer graphics in various applications such as Computer-Aided-Design (CAD), for example, for performing a number of operations on a display screen.

A user interface provides, among other things, an interface between a computer user and an application program executed via an operating system of the computer. In the absence of a user interface, the computer user has to learn application program commands and/or operating system commands which often require some technical expertise and knowledge. Instead of entering line commands to run an application program, to add a peripheral device, to activate a "Web" browser to connect to the Internet's World Wide Web, etc., the user interface allows even a computer novice to carry out these and other operations on the computer with ease and simplicity.

It is well known that via the user interface the user can, for example, view, manipulate, etc. images and graphical objects on a display screen via an input device such a mouse, light pen, keyboard, joystick, etc. coupled to a computer. Various operations associated with the images and objects are available to the user. For example, by selecting ("clicking" on) a particular object ("icon") on the screen, the user may start "running" an application program, change a screen or a set-up configuration of the computer, manage files in various directories and sub-directories, etc. One of the operations that the user interface of an application program with graphical images may provide is a so-called "pan" or "panning" operation which is explained hereinbelow.

FIG. 1 shows a graphical universe 100 that is much larger than a display screen 102 of a computer monitor, television set, etc. The entire universe may be available to the user for arranging, for example, various images/objects 104, 106, 108, 110, 112, 114, 116, 118 (as represented by icons) corresponding to application programs, images, files, etc. At any particular point in time, however, the user can perform operations only on a portion of the universe displayed on the display screen 102. Such portion of the universe, a so-called graphical space 122(a), as defined by the display screen 102, is available to the user for viewing and performing various operations.

To view another portion of the universe 100, for example, to the right of the currently displayed graphical space 122(a), the user typically moves a cursor 120 via an input device (not shown) to the right edge of the display screen 102 as shown by a first dashed arrow in FIG. 1. The user then "drags" the cursor 120 on the display screen 102 from right to left (as shown by a second dashed arrow), and another portion 122(b) of the universe 100 can be viewed on the display screen 102 as shown in FIG. 2. Thus, the panning operation is performed. In particular, to pan to the right for example, it is as if the user "grabs" the surface of a universe using the cursor as the "grabbing" tool and moves the universe to the left while the display screen remains stationary. As a result of the panning operation, the screen that may be thought of as a "porthole" displays another portion of the universe for user manipulation.

The above-described conventional panning of the images/objects 104, 106, 108, 110, 112, 114, 116, 118 on the display screen 102 entails several drawbacks. In particular, the user cannot perform the panning operation continuously. If, for example, the user wants to move diagonally from the upper right-hand corner to the lower left-hand corner of the universe, he has to grab the surface of the universe many times. Depending on a preselected resolution for the moving operation, the user pans across the universe incrementally. Among other things, this operation is inconvenient and time consuming.

Further, the speed of the conventional panning operation is dependent on the movement of the input device such as a mouse. For example, if the slow panning operation is required, the user has to move the mouse slowly; and in the fast panning operation, quick movements of the mouse have to be carried out by the user. These operations are also inconvenient and lack precision and control.

A need therefore exists for a user interface with graphics containing features that overcome the above disadvantages.

OBJECTS OF THE INVENTION

It is an object of the present invention to provide a panning operation in computer graphics.

It is another object of the present invention to dynamically control speed and direction of a panning operation in computer graphics.

It is a further object of the present invention to control the display of a graphical universe that is larger than a display screen in an easy and user-friendly manner.

SUMMARY OF THE INVENTION

These and other objects, features and advantages are accomplished by apparatus for displaying a graphical space. The inventive apparatus includes a display screen for displaying a portion of the graphical space, wherein the display screen is smaller than the graphical space. Further included in the inventive apparatus is a programmable controller for positioning a cursor at a preselected position on the display screen such that a reference location is fixed at the preselected position. The programmable controller is operative to move the cursor from the reference location on the display screen in a direction in which another portion of the graphical space is to be displayed. A line between the cursor and reference location is thus provided on the display screen to indicate the direction. The display screen displays another portion of the graphical space in response to the programmable controller.

In accordance with one aspect of the present invention, the display screen continuously displays additional portions of the graphical space as long as the cursor is spaced apart from the reference location.

In accordance with another aspect of the present invention, the length of the line indicates the speed with which another portion and additional portions of the graphical space in the direction of the line are displayed on the display screen.

BRIEF DESCRIPTION OF THE DRAWINGS

The above-mentioned as well as additional objects, features and advantages of the present invention will become readily apparent from the following detailed description thereof which is to be read in conjunction with the accompanying drawings, in which.

In all Figures, like reference numerals represent the same or identical components of the present invention.

DETAILED DESCRIPTION OF THE PREFERRED EMBODIMENTS

Figure 1:
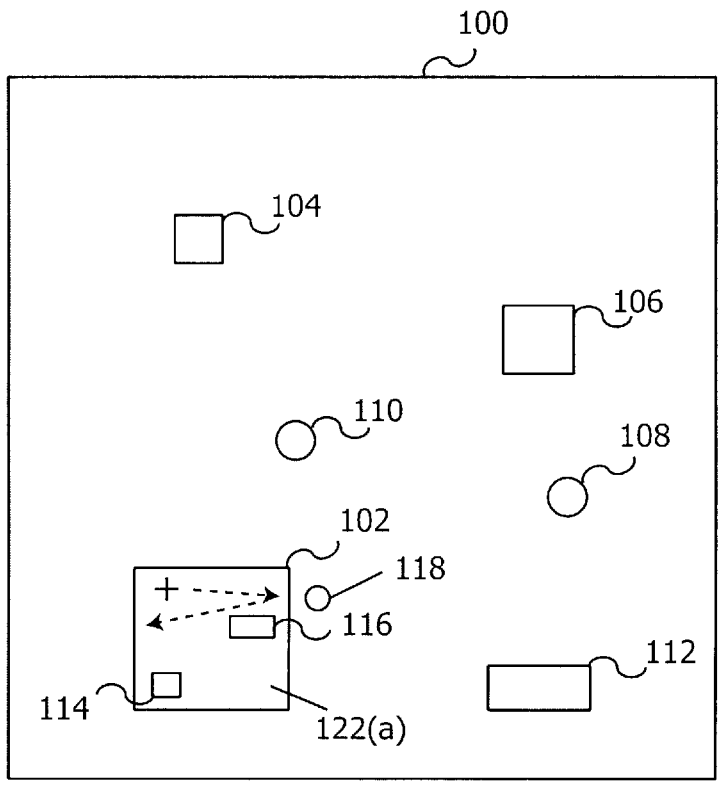
FIGS. 1 and 2 show a prior art panning operation.
Figure 2:
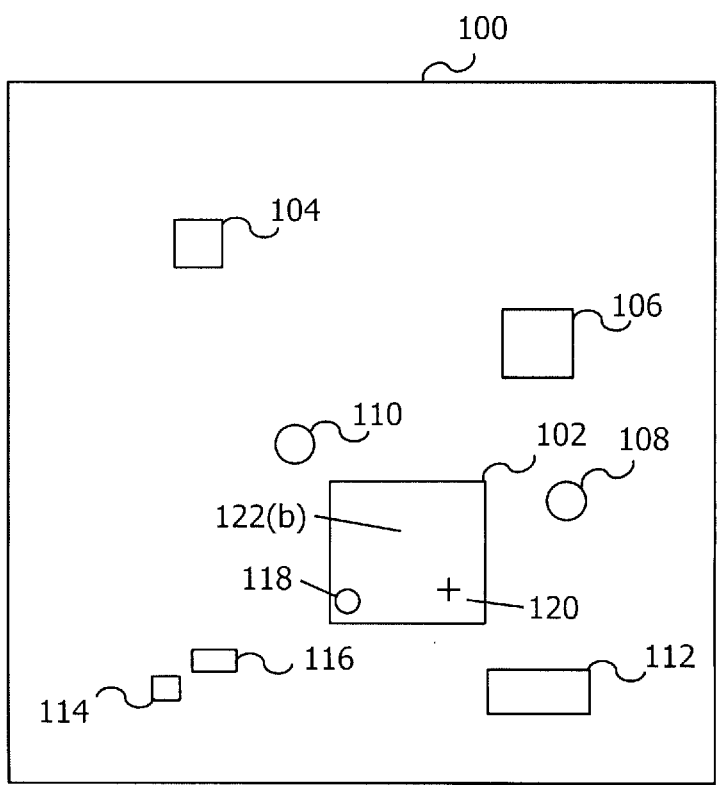
Figure 3:
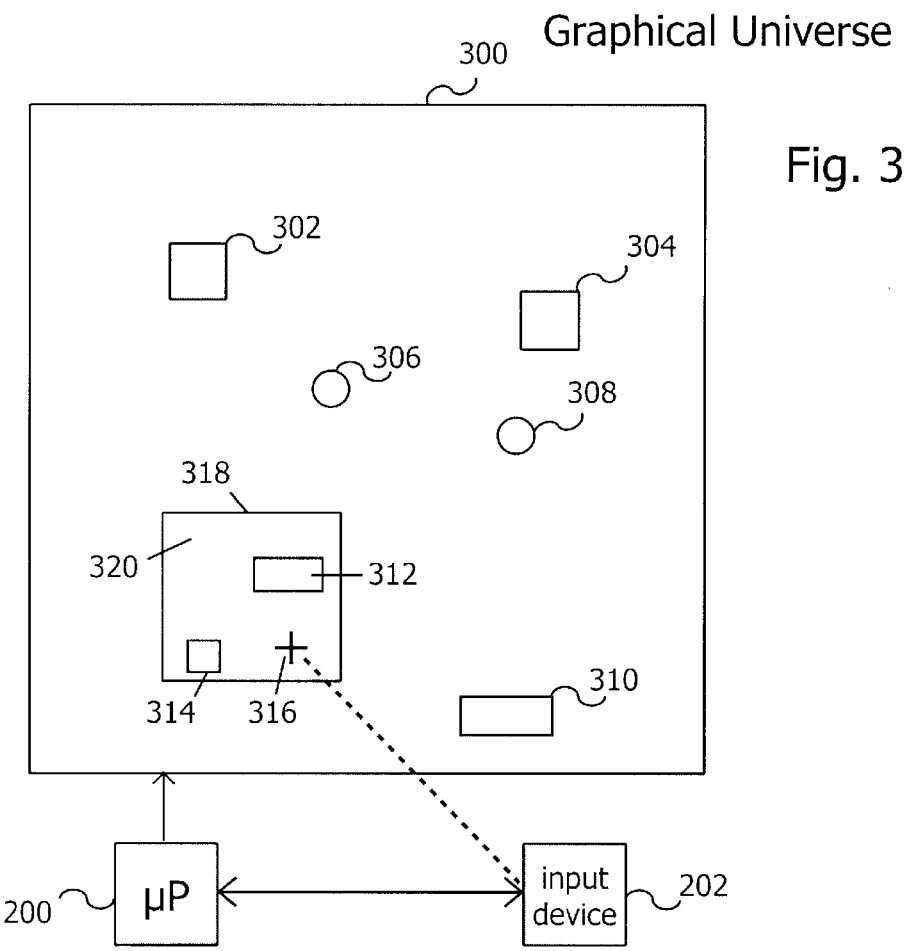
FIG. 3 shows a graphical universe, display screen, microprocesor and input device according to one embodiment of the present invention.

FIG. 3 shows a graphical universe 300 containing various graphical objects/images 302, 304, 306, 308, 310, 312, 314 (illustratively shown as icons) representing operations corresponding to each object. As mentioned above, such operations as starting an applications program, activating a modem, sorting files, etc. may be carried out by selecting (clicking on) a corresponding object. Also shown in FIG. 3 is a display screen 318 for displaying portions of the graphical universe 300 such as a graphical space 320. The user can view a portion of the universe 300 to perform the above-described operations using the objects 312, 314 in view. Alternatively, new objects may be created in the displayed portion of the universe 300, existing objects deleted or modified, etc.

FIG. 3 further shows a cursor 316 responsive to operations of an input device 202, such as a mouse, operated by the user. The input device 202 is controlled by a microprocessor 200. The graphical operations associated with the graphical universe 300 and/or display screen 318 are carried out via the microprocessor 200.

Figure 4:
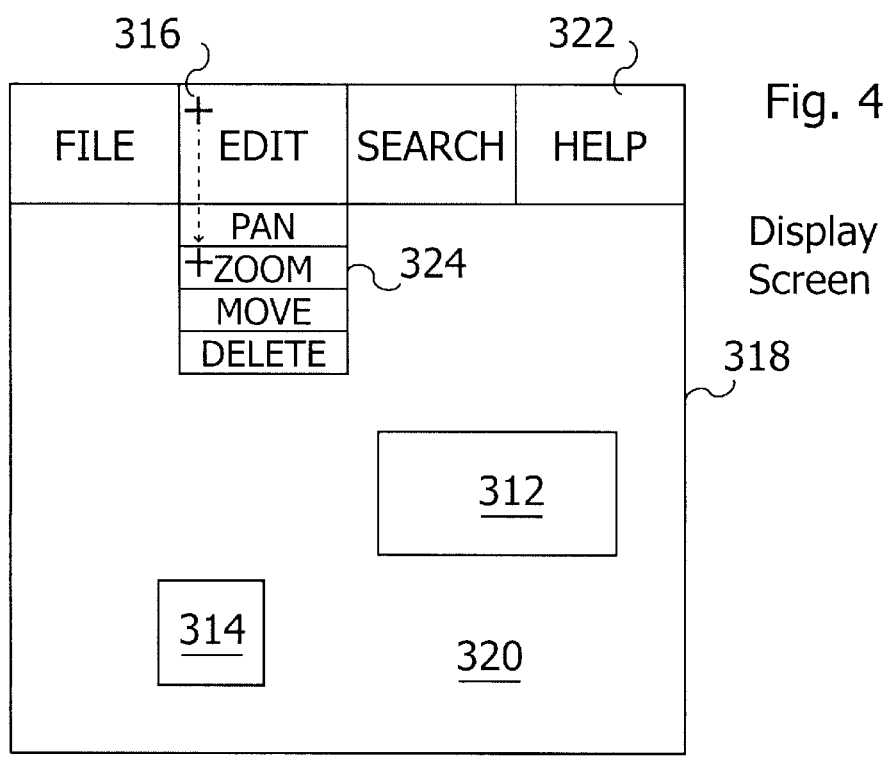
FIG. 4 illustrates a display screen with a toolbar for selecting a panning operation according to one aspect of the present invention.

According to one aspect of the present invention, the user, via the input device 202, positions the cursor 316 on a portion 322 (a so-called toolbar) on the display screen 318 as illustratively shown in FIG. 4. From the toolbar, a panning operation according to the present invention may be selected by moving the cursor 316 to an appropriate item in a pull-down menu, such as a sub-menu 324, and clicking on "PAN" of the sub-menu 324, for example, as shown in FIG. 4.

Figure 5:
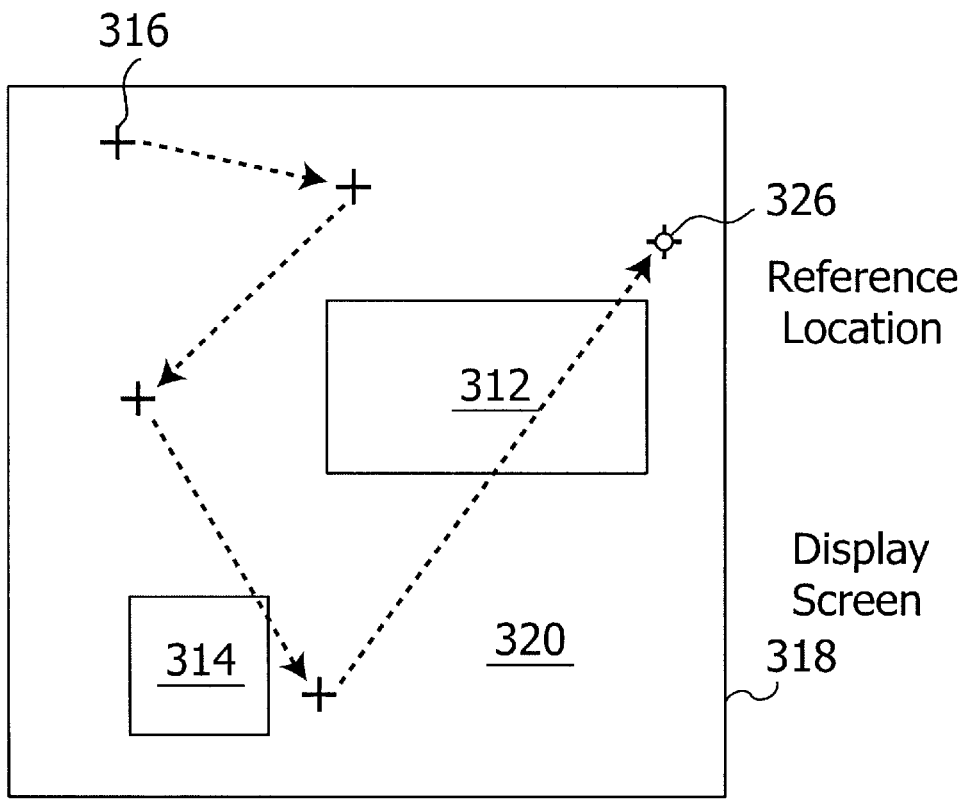
FIG. 5 illustrates how the user moves a cursor on the display screen and establishes a reference location according to present invention.

When the user selects the panning operation, the cursor 316 as manipulated via the input device 202 appears on the display screen 318 as shown in FIG. 5. The cursor 316 can be freely moved on the display screen 318 to any position thereon as shown by the dashed arrows in FIG. 5. Once a particular position is selected on the display screen 318, the user further activates the input device 202 (clicks the mouse button, for example). By clicking on the mouse button, a reference location (point) 326 at the current position of the cursor 316 is fixed on the display screen 318. As shown in FIG. 5, the reference location 326 is designated by a circle, but it is understood, of course, that any graphical object may be freely selected to represent the reference location. FIG. 5 shows that the cursor 316 is located substantially near or at the reference location 326. While holding the mouse button depressed (or alternatively, by clicking on the mouse button), the user can move the cursor 316 from the reference location 326 in any direction on the display screen 318. For example, by operating the input device 202, the cursor 316 can be moved in north, south, east and west directions with respect to the reference location 326 and in any other direction in-between with the full range of 360 degrees.

Figure 6:
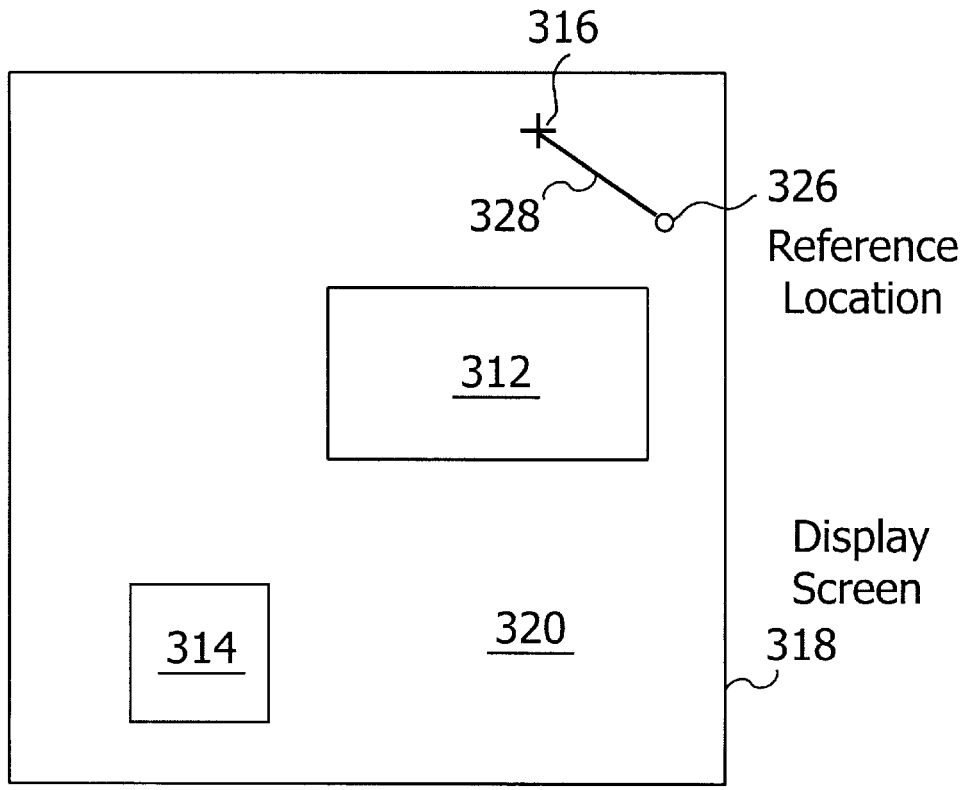
FIG. 6 shows a direction line between the cursor and the reference location of FIG. 5.
Figure 7:
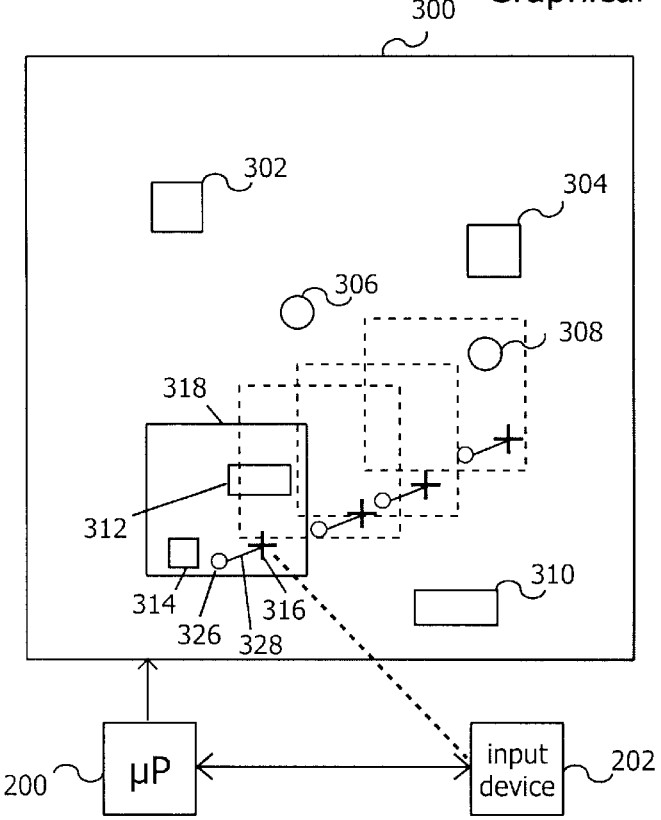
FIG. 7 shows a panning operation according to the present invention.
Figure 8:
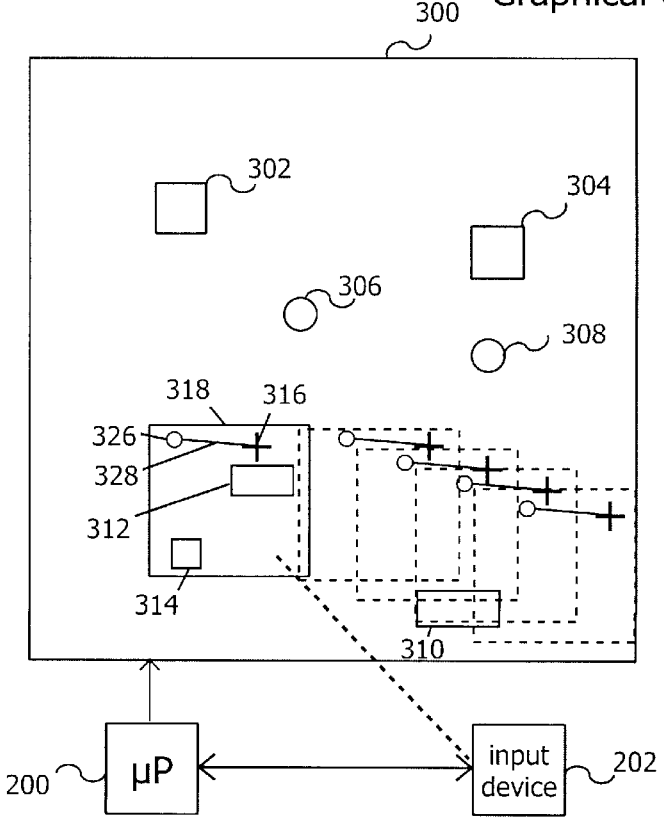
FIG. 8 shows a panning operation in a different direction from FIG. 7.

As the cursor 316 is moved away from the reference location 326, a direction line 328 appears on the display screen 318 as shown in FIG. 6. The direction line 328 indicates the direction in which the panning operation proceeds. As stated hereinabove, the direction of panning may be 360 degrees with respect to the reference location 326. Thus, as shown in FIG. 7, the panning operation occurs, for example, in approximately the north-east direction with respect to the reference location 326. FIG. 8 shows an illustrative panning operation in a direction different from the one in FIG. 7. The panning continues as long as the input device 202 is activated (the mouse button is depressed, the mouse button has been clicked, etc.).

In contrast to the conventional panning, according to the present invention it is as if the display screen 318 analogized previously to the porthole moves while the graphical universe 300 remains stationary. As a result, the user views one or more portions of the graphical universe 300 via the moving porthole (the display screen 318).

Figure 9A:
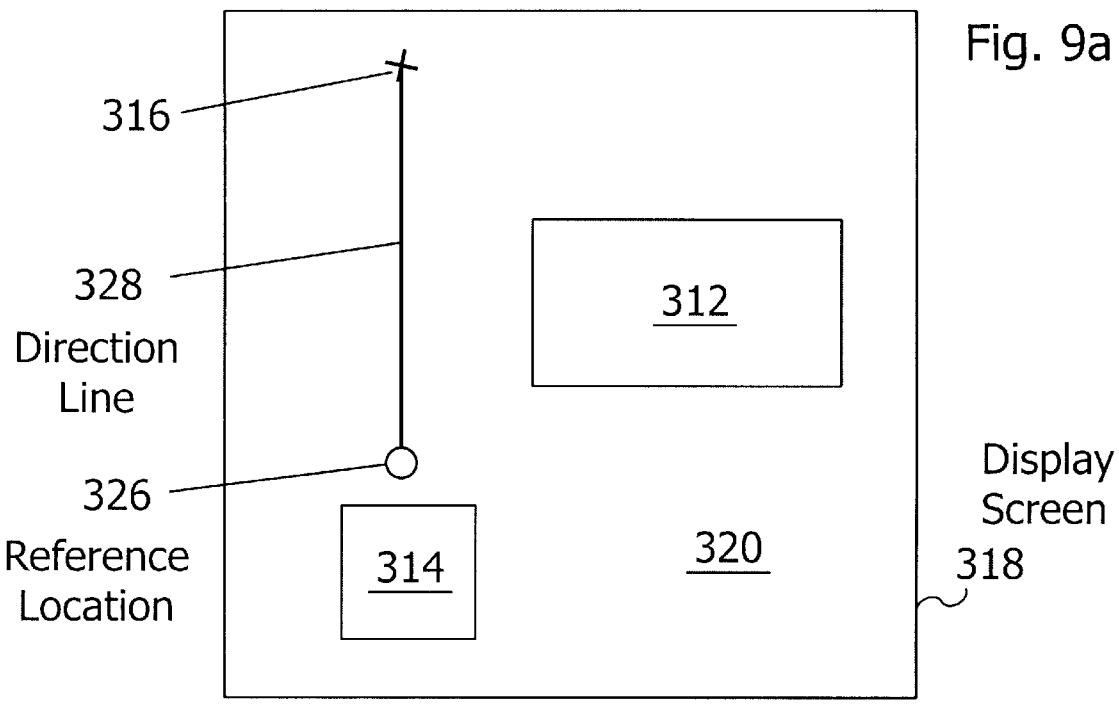
FIGS. 9a, 9b, 10a and 10b show how the speed of the panning operation is changed based on the length of a direction line.
Figure 9B:
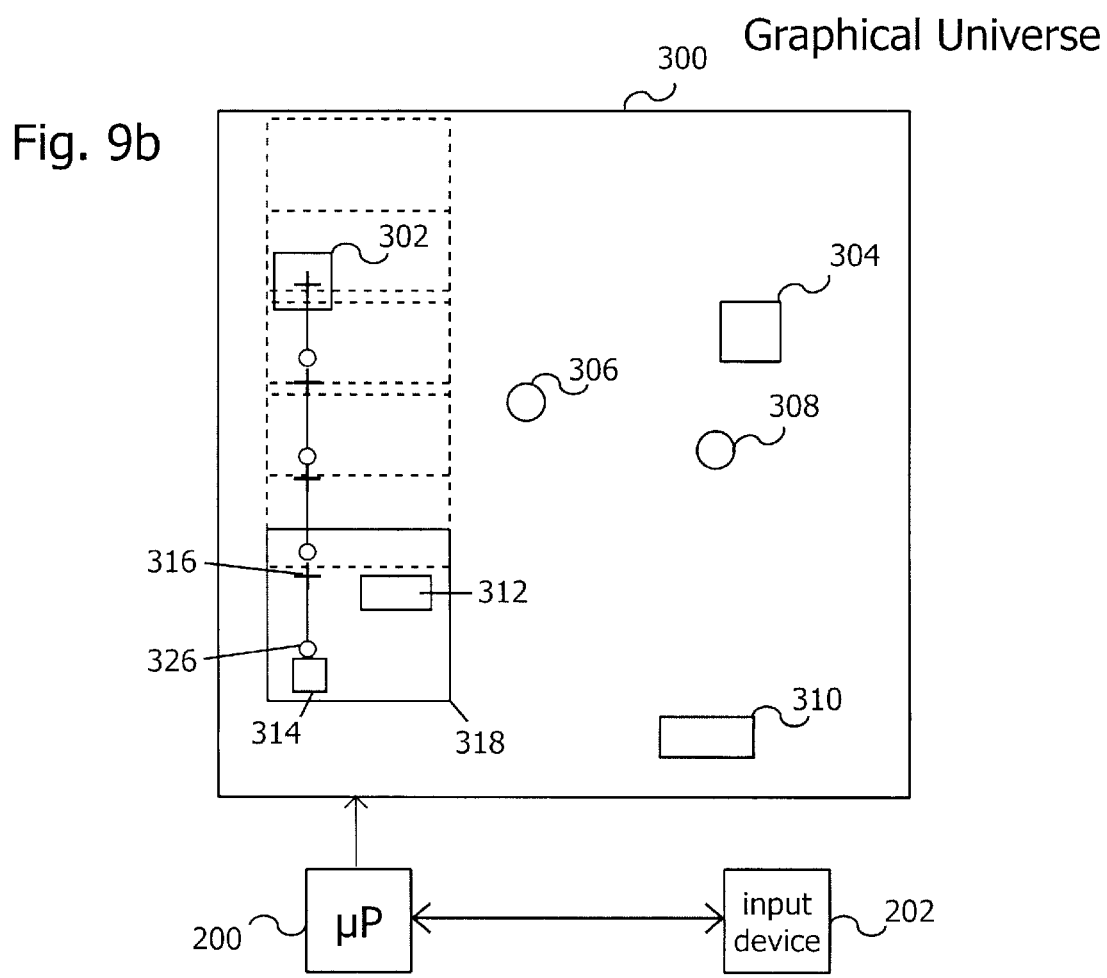
Figure 10A:
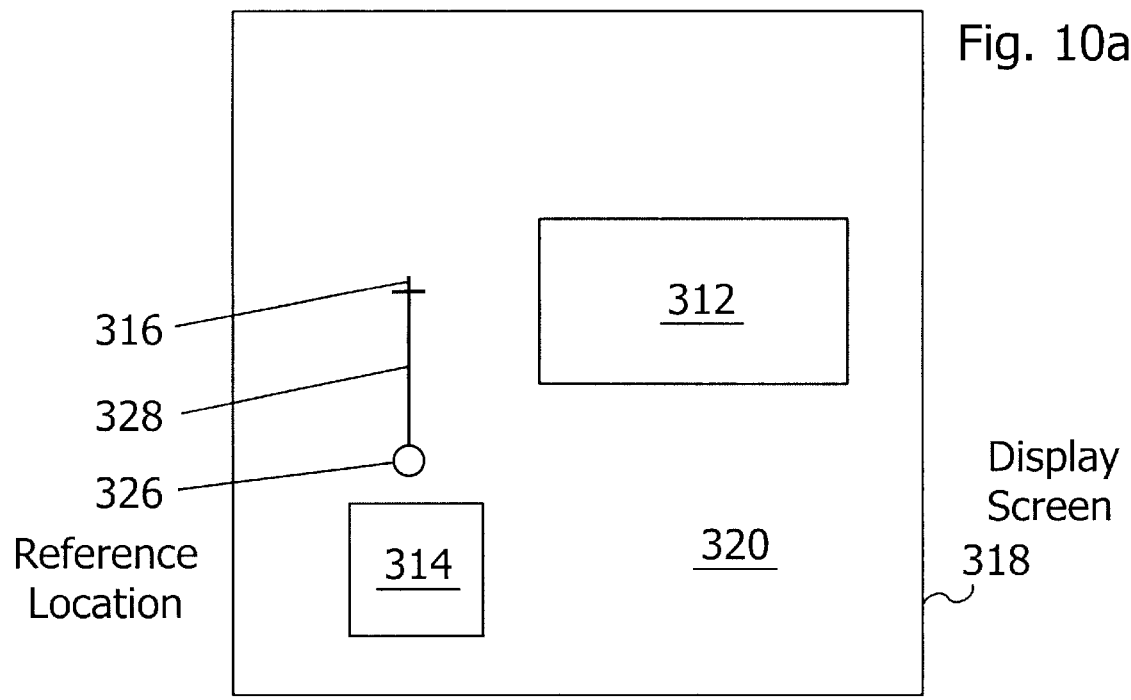
Figure 10B:
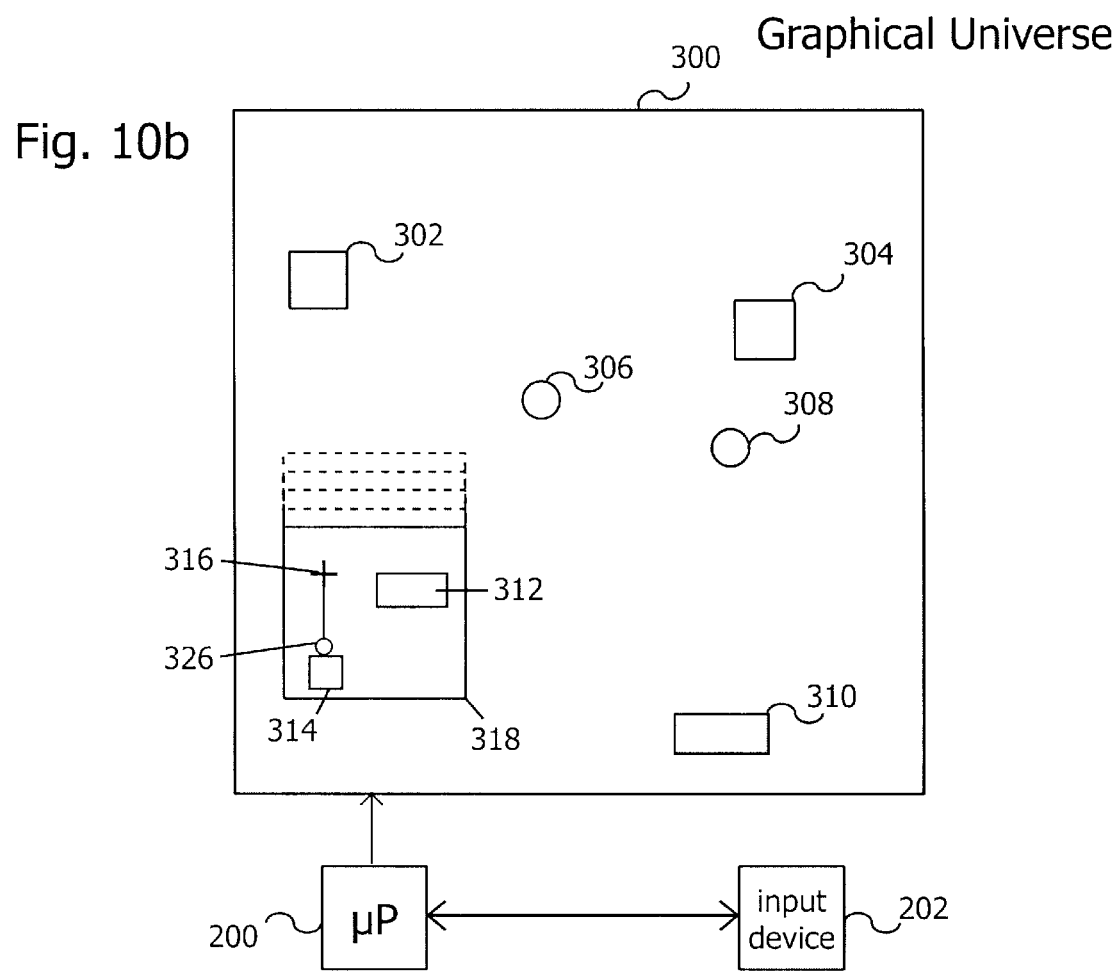

In another aspect of the present invention, the length of the direction line 328 indicates speed with which the panning operation occurs. The length of the direction line 328 is changed via the input device 202 (the movement of the mouse). If the direction line 328 is increased, panning across the universe 300 proceeds at a faster pace as shown in FIGS. 9a and 9b. Conversely, if the length of the direction line 328 is short, the speed of the panning operation is slow as shown in FIGS. 10a and 10b. The length of the direction line 328 (i.e., the speed of the panning operation) is controlled by the movement of the cursor 316 on the display screen 318.

When the user wants to stop panning across the universe 300, he deactivates the input device 202 (releases the mouse button, clicks on the mouse button again, etc.). The reference location 326 disappears from the display screen 318, and the panning operation is discontinued. Alternatively, the user may place the cursor 316 (via the input device 202) inside or at the reference location 326. Since the direction line 328 is substantially zero symbolizing no direction and zero speed according to the present invention, the panning operation substantially stops.

To summarize, according to the present invention as the cursor 316 is moved away from the reference location 326 using the input device 202 (the mouse button is depressed or has been clicked), the direction line 328 from the cursor 316 to the reference location 326 is provided on the display screen 318. The direction line 328 indicates the direction of panning as the display screen 318 appears to be moving across the graphical universe 300 which is stationary, and the length of the direction line 328 signifies the speed with which the panning operation is carried out in the preselected direction.

In contrast to the conventional technique, the present invention provides a continuous panning operation that can be controlled accurately using the input device. The above-described dynamic control of direction and speed in the panning operation further enhances the graphical user interface.

The above-mentioned figures show the cursor 316 being manipulated by the input device 202 under control of the microprocessor 200 which is coupled to the display screen

318 and/or graphical universe 300. It will be appreciated that any other programmable controller may be programmed to carry out the operations of the present invention as described hereinabove with reference to those figures. The present invention may be implemented on a dedicated system having a screen for displaying graphical objects including text, images, etc., an input device for manipulating those objects on the screen, and at least one programmable controller for effecting various functions in the system. Alternatively, the above operations may be performed on a general-purpose personal computer programmed to perform the operations in accordance with the present invention and equipped with an input device such as a mouse, lightpen, touch-screen display, remote control device, etc., and a display monitor.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A method for panning a graphical space across a display screen having a viewing area, comprising the steps of:

displaying a portion of said graphical space on said display screen which is smaller than said graphical space;

positioning a cursor at a selected position on said display screen and activating an input device that controls said cursor such that a reference location is fixed at said selected position, said selected position being any location within the viewing area of said display screen;

moving said cursor from said reference location on said display screen in a direction in which another portion of said graphical space which is to be displayed is located, such that a line between said cursor and said reference location is provided on said display screen to indicate said direction; and sliding said graphical space across said display screen in said direction until the desired portion of said graphical space is on said display screen.

2. A method for panning a graphical space across a display screen having a viewing area, comprising the steps of:

displaying a portion of said graphical space on said display screen which is smaller than said graphical space;

positioning a cursor at a selected position on said display screen such that a reference location is fixed at said selected position, said selected position being any location within the viewing area of said display screen;

moving said cursor from said reference location on said display screen in a direction in which another portion of said graphical space which is to be displayed is located, such that a line between said cursor and said reference location is provided on said display screen to indicate said direction; and sliding said graphical space across said display screen in said direction until the desired portion of said graphical space is on said display screen and varying a display speed of sliding said graphical space across said display screen in the direction of said line in response to a length of said line.

3. The method according to claim 2, wherein the length of said line is indicative of said display speed.

4. The method according to claim 3, wherein said display speed of sliding said graphical space increases if the length of said line is increased, and said display speed of sliding said graphical space is reduced if the length of said line is decreased.

5. An apparatus for panning a graphical space across a display screen, comprising:

a display screen having a viewing area for displaying a portion of said graphical space, said display screen being smaller than said graphical space;

an input device for positioning a cursor at a selected position on said display screen such that a reference location is fixed at said selected position, said selected position being any location within the viewing area of said display screen; said input device being operative to move said cursor from said reference location on said display screen in a direction in which another portion of said graphical space which is to be displayed is located, such that a line between said cursor and said reference location is provided on said display screen to indicate said direction;

sliding means for sliding said graphical space across said display screen in said direction until the desired portion of said graphical space is displayed on said display screen; and said input device being operative to vary a display speed of sliding said graphical space across said display screen in the direction of said line in response to a length of said line.

6. The apparatus according to claim 5, wherein the length of said line is indicative of said display speed.

* * * * *